United States Patent
Kounosu et al.

(10) Patent No.: US 9,719,500 B2
(45) Date of Patent: Aug. 1, 2017

(54) CRYOGENNIC LIQUEFIED GAS INTAKE/DISCHARGE VALVE BODY, RECIPROCATING PUMP, AND FUEL GAS SUPPLY DEVICE

(71) Applicant: Mitsui Engineering & Shipbuilding Co., Ltd., Chuo-ku, Tokyo (JP)

(72) Inventors: Makoto Kounosu, Tokyo (JP); Renzo Kanda, Tokyo (JP)

(73) Assignee: MITSUI ENGINEERING & SHIPBUILDING, Tokyo (JP)

( * ) Notice: Subject to any disclaimer, the term of this patent is extended or adjusted under 35 U.S.C. 154(b) by 121 days.

(21) Appl. No.: 14/763,990

(22) PCT Filed: Dec. 26, 2014

(86) PCT No.: PCT/JP2014/084472
§ 371 (c)(1),
(2) Date: Jul. 28, 2015

(87) PCT Pub. No.: WO2015/099106
PCT Pub. Date: Jul. 2, 2015

(65) Prior Publication Data
US 2015/0369228 A1 Dec. 24, 2015

(30) Foreign Application Priority Data
Dec. 26, 2013 (JP) ................. 2013-269035

(51) Int. Cl.
*F04B 15/08* (2006.01)
*F04B 53/10* (2006.01)
(Continued)

(52) U.S. Cl.
CPC ............. *F04B 15/08* (2013.01); *B63H 21/14* (2013.01); *F02M 21/023* (2013.01);
(Continued)

(58) Field of Classification Search
CPC ........... F02M 21/0215; F02M 21/0221; F02M 21/0227; F02M 21/026; F02M 21/0287;
(Continued)

(56) References Cited

U.S. PATENT DOCUMENTS 3,364,679 A * 1/1968 Osojnak .................. F16H 39/10
60/329
3,630,639 A * 12/1971 Duron ..................... F04B 15/08
417/435
(Continued)

FOREIGN PATENT DOCUMENTS

JP 44-28067 B1 11/1969
JP H04-20821 B2 1/1992
(Continued)

OTHER PUBLICATIONS

International Search Report of the corresponding International Application No. PCT/JP2014/084472, dated Apr. 7, 2015.

*Primary Examiner* — Hai Huynh
*Assistant Examiner* — Long T Tran
(74) *Attorney, Agent, or Firm* — Global IP Counselors, LLP

(57) ABSTRACT

A fluid intake/discharge valve body for suction of a cryogenic liquefied gas fluid into a cylinder liner and discharge of the gas fluid with a piston, includes: a valve seat body including a fluid supply portion to supply the fluid and a fluid exhaust portion; an intake valve biased against the fluid supply portion; and a discharge valve biased against the fluid exhaust portion. The fluid supply portion includes a supply pathway connected to a supply pipe; a dividing wall including intake holes facing the intake valve; and a counterbore recessed portion on the dividing wall to surround the intake holes. The intake valve abuts an edge of the recessed portion when biased against the fluid supply portion. The discharge valve receives fluid pressure from a side of the discharge
(Continued)

hole including a recessed portion disposed in a region wider than an outer periphery of the discharge hole.

20 Claims, 9 Drawing Sheets

(51) Int. Cl.
    *F02M 21/02*     (2006.01)
    *F02M 21/06*     (2006.01)
    *B63H 21/14*     (2006.01)
    *F04B 9/10*     (2006.01)
    *F17C 13/04*     (2006.01)
    *F02M 59/10*     (2006.01)
    *F02M 59/46*     (2006.01)

(52) U.S. Cl.
    CPC .... *F02M 21/0212* (2013.01); *F02M 21/0215* (2013.01); *F02M 21/0218* (2013.01); *F02M 21/0221* (2013.01); *F02M 21/06* (2013.01); *F04B 9/10* (2013.01); *F04B 53/10* (2013.01); *F17C 13/04* (2013.01); *F02M 59/105* (2013.01); *F02M 59/462* (2013.01); *F02M 59/464* (2013.01); *F04B 2015/081* (2013.01); *Y02T 10/32* (2013.01); *Y02T 70/5218* (2013.01)

(58) Field of Classification Search
    CPC .. F02M 21/042; F02M 59/38; F04B 39/0005; F04B 2015/081; F04B 15/00; F04B 49/22; F04B 53/16
    See application file for complete search history.

(56) References Cited

U.S. PATENT DOCUMENTS

| | | |
|---|---|---|
| 5,996,472 A | 12/1999 | Nguyen et al. |
| 6,581,390 B2 * | 6/2003 | Emmer ............... F17C 7/04 62/50.6 |
| 2003/0080512 A1 | 5/2003 | Colson |
| 2008/0047629 A1 * | 2/2008 | Holtzman ............ F04B 33/00 141/65 |
| 2013/0205986 A1 | 8/2013 | Rampen et al. |

FOREIGN PATENT DOCUMENTS

| | | |
|---|---|---|
| JP | 2012-177333 A | 9/2012 |
| JP | 2012-002224 A | 1/2014 |
| WO | 2013-118182 A1 | 8/2013 |

* cited by examiner

CRYOGENNIC LIQUEFIED GAS INTAKE/DISCHARGE VALVE BODY, RECIPROCATING PUMP, AND FUEL GAS SUPPLY DEVICE

CROSS-REFERENCE TO RELATED APPLICATION

This U.S. National stage application claims priority under 35 U.S.C. §119(a) to Japanese Patent Application No. 2013-269035, filed in Japan on Dec. 26, 2013, the entire contents of Japanese Patent Application No. 2013-269035 are hereby incorporated herein by reference.

BACKGROUND

Field of the Invention

The present disclosure relates to a fluid intake/discharge valve body used in the intake of a cryogenic liquefied gas into a cylinder liner and the discharge of the cryogenic liquefied gas with a piston, a reciprocating pump that employs the valve body, and a fuel gas supply device that employs the reciprocating pump.

Background Information

Conventionally, there are many diesel engines that operate with a natural gas generated by vaporizing a liquefied natural gas (hereinafter, referred as "LNG") as a fuel. However, recently, various high-pressure gas injection two-stroke low-speed diesel engines have been provided, in order to improve emission performance of main engine for environment in a current two-stroke low-speed oil burning diesel engine. Accordingly, among diesel engines, a high-pressure gas injection two-stroke low-speed diesel engine is needed that has high thermal efficiency and high engine output. In particular, there is a need for an application to a marine vessel, etc.

For example, a gas fuel supply device for a natural gas or the like that is applied to a main engine or a generator-driven engine of a marine vessel, and a device that highly pressurizes a liquefied gas fuel via a reciprocating pump that may be easily disposed in a gas hazard area, are known (see, JP-A 2012-177333, hereinafter referred to as "Patent Literature 1").

The device includes: a reciprocating pump driven by a hydraulic motor, the reciprocating pump configured to raise pressure of the liquefied gas that has been introduced up to a predetermined pressure, and to discharge the liquefied gas; a hydraulic pump unit configured to supply hydraulic pressure for driving the hydraulic motor from a variable-capacity hydraulic pump that is driven by an electric motor; a heating device configured to heat and gasify liquefied gas supplied from the reciprocating pump after the pressure has been increased; and a controller configured to adjust a rotational velocity of the hydraulic motor, and to maintain a constant gas fuel input/output pressure of the heating device. In other words, a hydraulic pump unit positioned outside a gas hazard area is configured to supply hydraulic pressure for driving the hydraulic motor from a variable-capacity hydraulic pump that is driven by an electric motor to a hydraulic motor positioned in a gas hazard area, and to drive the reciprocating pump using hydraulic pressure, such that the pressure of the liquefied gas is raised to a predetermined pressure and the liquefied gas is discharged.

Moreover, a cryogenic liquid piston pump that has been designed for a high operating pressure is also known as an example of a reciprocating pump (see, JP-A 2012-2224, hereinafter referred to as "Patent Literature 2"). In the piston pump, a valve head includes: a cavity that corresponds to a piston distal end having an outlet opening; and an exhaust valve is adjacent to the outlet opening. The exhaust valve is positioned so as to be inserted into a cylinder head. The piston distal end configured to pass through a region of the cavity in a case where a piston pump operation is being maximized. Accordingly, the piston distal end is configured so as to tightly fit into the cavity of the valve head. A low temperature medium is always completely mechanically exhausted from the valve head during each piston pump operation via a complete insertion of the piston distal end into the cavity region during a maximum piston operation. The exhaust valve is directly adjacent to the outlet opening of the valve head, and the exhaust valve is positioned so as to be inserted into a sealed pressure pipe. Accordingly, a cavity within a pump operation chamber in which the residual low temperature medium may remain is lacking, and functional disorder from a residual medium is significantly decreased.

SUMMARY

Highly efficient discharge of a liquefied gas pressured up to a predetermined pressure is desirable for increasing an intake efficiency or a discharge efficiency of the liquid fuel (volumetric efficiency) in a reciprocating pump. To accomplish an increase in an intake efficiency or a discharge efficiency of the liquid fuel (volumetric efficiency) in a reciprocating pump, a reduction of a pressure difference, which causes valves of the reciprocating pump to start operation (hereinafter, referred as "pressure difference"), between two spaces separated by the intake valve or the discharge valve is desirable in order to avoid vaporization of the liquid fuel.

However, the abovementioned gas fuel supply device (see, Patent Literature 1) does not disclose any structure of the reciprocating pump. In the abovementioned piston pump (see, Patent Literature 2), a low temperature medium is always completely mechanically exhausted from the valve head, because the piston distal end is configured so as to tightly fit into the cavity of the valve head. The exhaust valve of the piston pump is configured such that, the exhaust valve is directly adjacent to the outlet opening of the valve head and the exhaust valve is positioned so as to be inserted into a sealed pressure pipe. Accordingly, the medium does not remain behind in the piston pump and the piston pump does not create residual pressure. Thus, the piston pump is intended to improve the discharge of the medium, but it does not disclose a means for increasing the intake efficiency as well as a discharge efficiency of the medium. In a case of a suction of the medium, in other words, the liquefied gas, the pressure difference between a pressure (operating pressure) of a space on a side of the piston to open the intake valve and a pressure of a space on a side of the medium to be sucked is desirably reduced in a point of view that the pressure difference causes vaporization of the medium due to a reduction of a pressure in a space on a side of the piston by a piston's backward movement to open the intake valve.

Accordingly, the object of the present invention is to provide a fluid intake/discharge valve body, a reciprocating pump, and a fuel gas supply device for cryogenic liquefied gas, which are capable to reduce the pressure difference between two spaces separated by the intake valve or the discharge valve of the reciprocating pump, to increase an intake efficiency of the liquid fuel (volumetric efficiency) in a space on a piston side of the reciprocating pump or a discharge efficiency of the liquid fuel (volumetric efficiency) of the reciprocating pump.

A fluid intake/discharge valve body for cryogenic liquefied gas includes different aspects as mentioned below.

Aspect 1

A fluid intake/discharge valve body that is used for suction of a cryogenic liquefied gas fluid into a cylinder liner and a discharge of a cryogenic liquefied gas fluid with a piston, including:
- a valve seat body, including:
- a fluid supply portion configured to supply the fluid, and
- a fluid exhaust portion configured to exhaust the fluid;
- an intake valve configured to be biased against the fluid supply portion of the valve seat body; and
- a discharge valve configured to be biased against the fluid exhaust portion of the valve seat body,
- the fluid supply portion, including:
  - a supply pathway configured to connect to a supply pipe,
  - a dividing wall including a plurality of intake holes configured to face the intake valve disposed at an end of the supply pathway, and
  - a counterbore that is a recessed portion disposed on the dividing wall, the counterbore surrounding the plurality of intake holes, and the counterbore configured such that the intake valve abuts an edge of the recessed portion in a case where the intake valve is biased against the fluid supply portion.

Aspect 2

The fluid intake/discharge valve body according to aspect 1, wherein all of the intake holes are surrounded by the one counterbore disposed on the dividing wall.

Aspect 3

The fluid intake/discharge valve body according to aspect 1 or 2, wherein an intake spring is configured to bias the intake valve against the fluid supply portion and an intake spring support member configured to support the intake spring are disposed on the valve seat body, and the intake spring support member is fixed to the valve seat body.

Aspect 4

The fluid intake/discharge valve body according to any of aspects 1 to 3, wherein a discharge spring is configured to bias the discharge valve against the fluid exhaust portion and an discharge spring support member configured to support the discharge spring are disposed on the valve seat body, and the discharge spring support member is fixed to the valve seat body.

Aspect 5

The fluid intake/discharge valve body according to any of aspects 1 to 4, wherein the discharge valve is configured to block a discharge hole by abutting a wall of the peripheral edge of a discharge hole, the discharge hole being disposed in the fluid exhaust portion to discharge the fluid, and
the discharge valve has a portion configured to receive pressure of the fluid from a side of the discharge hole, the portion of the discharge valve including a pressure-receiving recessed portion recessed with a step for the portion of the discharge valve that is configured to abut the wall of the peripheral edge of the discharge hole, the pressure-receiving recessed portion being disposed in a region that is wider than an outer periphery of the discharge hole.

Aspect 6

The fluid intake/discharge valve body according to any of aspects 1 to 5, wherein the discharge valve has a cylindrical shape closed at one end, the discharge valve is configured to block the discharge hole that is connected to a liquid fuel filled cylinder liner interior space defined by the piston and the cylinder liner, the discharge valve includes a discharge valve through-hole connecting an exterior space and an interior space of the cylindrical shape, the discharge valve is configured to guide the discharged fluid from the exterior space to the interior space in a case where the discharge hole is open, and the discharge valve is configured to direct the discharged fluid to an exhaust hole disposed on a cylindrical discharge spring support member that supports a discharge spring biasing the discharge valve against the fluid exhaust portion, and
the cylindrical discharge spring support member has a support member through hole disposed in a cylindrical side wall thereof, the support member through hole connecting an outside of the cylindrical discharge spring support member and the exhaust hole that is in the cylindrical discharge spring support member, and the support member through hole being configured to guide a portion of the discharged fluid existing in the outside of the cylindrical discharge spring support member into the exhaust hole in a case where the discharge hole is opened by the discharge valve.

Aspect 7

The fluid intake/discharge valve body according to aspect 6, wherein the discharge valve is configured to abut the wall of the peripheral edge of the discharge hole in a case where the discharge hole is blocked, and
the wall of the peripheral edge of the discharge hole includes a high hardness member having a Vickers harness higher than a portion positioned on an exterior of the wall of the peripheral edge of the valve seat body.

Aspect 8

A fluid intake/discharge valve body that is used for a suction of a cryogenic liquefied gas fluid into a cylinder liner and a discharge of a cryogenic liquefied gas fluid with a piston, including:
- a valve seat body, including:
- a fluid supply portion configured to supply the fluid, and
- a fluid exhaust portion configured to exhaust the fluid;
- an intake valve configured to be biased against the fluid supply portion of the valve seat body; and
- a discharge valve configured to be biased against the fluid exhaust portion of the valve seat body,
- the discharge valve is configured to block a discharge hole disposed in the fluid exhaust portion by abutting a wall of the peripheral edge of the discharge hole, the discharge hole being disposed in the fluid exhaust portion to discharge the fluid, and
- the discharge valve having a portion configured to receive pressure of the fluid from a side of the discharge hole, the portion including a pressure-receiving recessed portion recessed with a step for a portion of the discharge valve that is configured to abut the wall of the peripheral edge of the discharge hole, the pressure-receiving recessed portion being disposed in a region that is wider than an outer periphery of the discharge hole.

Aspect 9

A reciprocating pump, including:
- a main body including:
- a piston configured to discharge a cryogenic liquefied gas fluid,
- a cylinder liner configured to suck in the cryogenic liquefied gas fluid, and
- a cylinder liner interior space defined by the piston and the cylinder liner;
- an intake/discharge valve body according to any one of aspects 1 to 8, configured to abut the main body;

a cylinder including:
  a recessed portion into which the cylinder liner and then the intake/discharge valve body are configured to be inserted, the cylinder liner and the intake/discharge valve being in contact with each other such that the cylinder liner interior space and both of the dividing wall of the fluid supply portion and the fluid exhaust portion face each other, and
  a supply through-hole disposed on a wall of the recessed portion and configured to supply the fluid; and
a cylinder cover disposed at an opening of the recessed portion of the cylinder and including an exhaust through-hole configured to exhaust the discharged fluid, the cylinder cover configured to fix the intake/discharge valve body in the recessed portion by pressing the intake/discharge valve body towards an inside of the recessed portion.

Aspect 10

The reciprocating pump according to aspect 9, wherein the intake/discharge valve body is an integrated structure that is integrally exchangeable.

Aspect 11

A fuel gas supply device, including:
  a tank configured to store liquid fuel that is a cryogenic liquefied gas fluid;
  a reciprocating pump according to any one of aspect 9 or 10, configured to suck the liquid fuel from the tank and exhaust the liquid fuel under a constant pressure;
  a vaporization device configured to vaporize the liquid fuel that is exhausted into a gas; and
  a gas supply pipe configured to supply the gas to a gas combustion engine, According to the abovementioned cryogenic liquefied gas intake/discharge valve body, reciprocating pump, and fuel gas supply device, the pressure difference between two spaces separated by the intake valve or the discharge valve of the reciprocating pump may be reduced at a start of the intake/discharge valve operation. Accordingly, an intake efficiency of the liquid fuel in a space on a side of piston of the reciprocating pump or a discharge efficiency (volumetric efficiency) of the liquid fuel of the reciprocating pump may be increased.

DESCRIPTION OF EMBODIMENTS

Hereinafter, a cryogenic liquefied gas intake/discharge valve body, a reciprocating pump, and a fuel gas supply device of a present embodiment will be described in further detail.

Fuel Gas Supply Device

Figure 1:
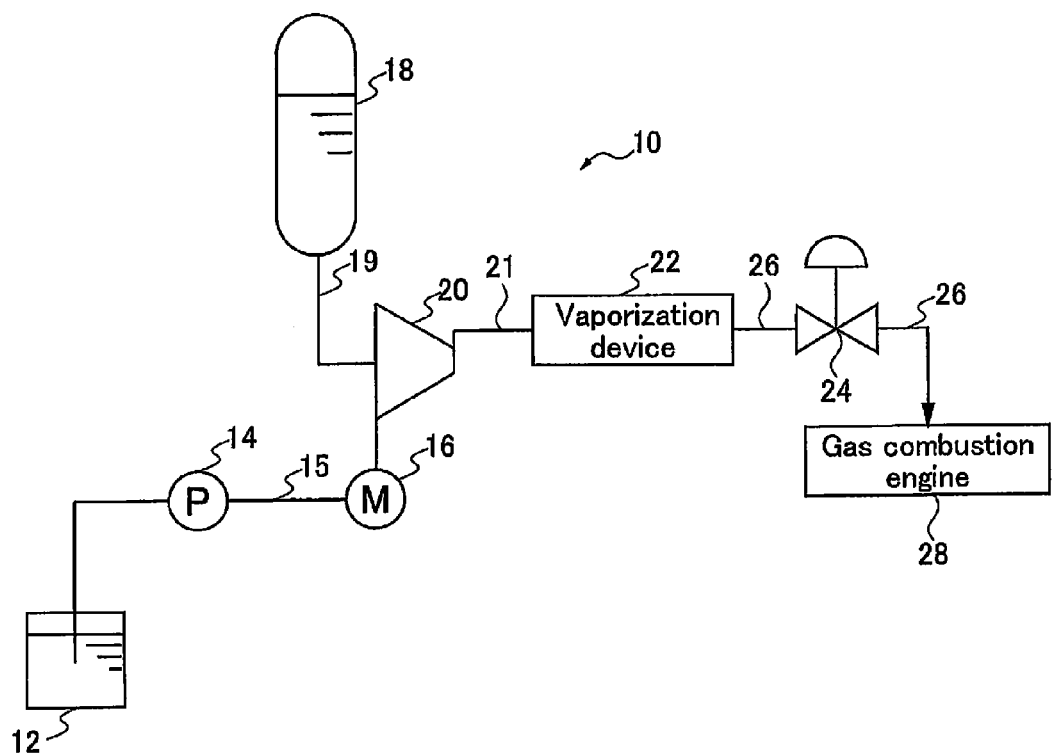
FIG. 1 illustrates a schematic diagram of a fuel gas supply device of a present embodiment applied to a cryogenic liquefied gas intake/discharge valve body and reciprocating pump of a present embodiment.

FIG. 1 illustrates a schematic diagram of a fuel gas device 10 of a present embodiment applied to a cryogenic liquefied gas intake/discharge valve body and reciprocating pump of a present embodiment.

The fuel gas supply device 10 is configured to ignite the fuel gas generated by vaporizing a liquid fuel (fluid composed of a cryogenic liquefied gas) under high pressure, and to supply the fuel gas to an inner fuel chamber of a gas combustion engine 28. A gas combustion engine 28 of the present embodiment is a diesel engine that is mounted on a ship, e.g., that may be used in a two-stroke low-speed diesel engine.

A fuel gas supply device 10, as illustrated in FIG. 1, mainly includes: a hydraulic oil storage tank 12; a hydraulic pump 14; a hydraulic motor 16; a liquid fuel tank 18; a reciprocating pump 20; a vaporization device 22; and a pressure regulating valve 24. Moreover, the fuel gas supply device 10 includes: a hydraulic pipe 15; a low temperature liquid fuel supply pipe 19; a high pressure liquid fuel supply pipe 21; and a gas fuel supply pipe 26.

All of the constituent elements of the fuel gas supply device 10 are mounted to a ship.

The hydraulic oil storage tank 12 stores hydraulic fluid which is used to supply hydraulic pressure that drives the hydraulic motor 16.

The liquid fuel tank 18 stores the liquid fuel prior to vaporization of the fuel gas that is supplied to the gas combustion engine 28. A liquefied natural gas (LNG), a liquefied petroleum gas (LPG), or the like, may be used as the liquid fuel. The liquid fuel tank 18 is configured to connect to a low temperature liquid fuel supply pipe 19, and the liquid fuel tank 18 is configured to supply liquid fuel to the reciprocating pump 20 via the low temperature liquid fuel supply pipe 19.

The reciprocating pump 20 is connected to the low temperature liquid fuel supply pipe 19 on an intake side, and the reciprocating pump 20 is connected to the high temperature liquid fuel supply pipe 21 on a discharge side. The reciprocating pump 20 is configured to suck liquid fuel in from the liquid fuel tank 18 via the low temperature liquid fuel supply pipe 19 and raise pressure of the liquid fuel to a constant pressure, and to exhaust the liquid, fuel to the vaporization device 22 via the high pressure liquid fuel supply pipe 21. In the reciprocating pump 20, a piston performs the reciprocating motion.

The hydraulic motor 16 is a power source that drives the reciprocating pump 20. For example, a rotating motion of a hydraulic motor 16 may be converted into a reciprocating motion of a piston of the reciprocating pump 20 with a crank (not illustrated).

The hydraulic motor 16 is driven by hydraulic pressure supplied via the hydraulic pipe 15, after the pressure of the hydraulic fluid sucked into hydraulic pump 14 from the hydraulic oil storage tank 12 has been raised. An oil-based or aqueous hydraulic fluid may be employed as the hydraulic fluid of the present embodiment. An aqueous hydraulic fluid is a hydraulic fluid that includes water, e.g., includes an O/W emulsion, a W/O emulsion or a polyglycol liquid solution, as a main component.

While a hydraulic motor 16 that is driven by a hydraulic fluid is used in the present embodiment, an electric motor may be used in place of the hydraulic storage tank 12, the hydraulic pump 14, and the hydraulic motor 16. It is desirable that an explosion-proof treatment is performed in a case where employing an electric motor in hazard region. Accordingly, the power source of the reciprocating pump 20 is not particularly limited in any manner, and a conventional power source may be employed.

The vaporization device 22 is configured to be connected to the high pressure liquid fuel supply pipe 21 on the intake side, and the vaporization device 22 is configured to be connected to the gas fuel supply pipe 26 on the exhaust side. The vaporization device 22 gasifies the liquid fuel by heating and vaporizing the high pressured liquid fuel supplied by the high pressure fuel supply pipe 21. Combustion heat of a boil-off gag that is generated by the liquid fuel tank 18, or the like, may be employed as a heating source that heats the liquid fuel. For example, the liquid fuel may be heated by heat exchange of warm water heated by the combustion heat of the boil-off gas.

A pressure-regulating valve 24 is disposed on the fuel gas supply pipe 26. The fuel gas supply pipe 26 is configured to be connected to the vaporization device 22 at one end and a fuel chamber of the gas combustion engine 28 at another end. The fuel gas generated from vaporized liquid fuel is regulated at a pressure (e.g., 150 to 300 bars) in a predetermined range via the pressure-regulating valve 24, and then supplied to the fuel combustion chamber of the gas combustion engine 28 via the gas fuel supply pipe 26.

While not illustrated in FIG. 1, a hydraulic pressure valve (e.g., a relief valve, a check valve, a flow control valve) may be optionally employed in order to regulate pressure or a supply amount of hydraulic pressure, liquid fuel, or gas.

Reciprocating Pump

Figure 2:
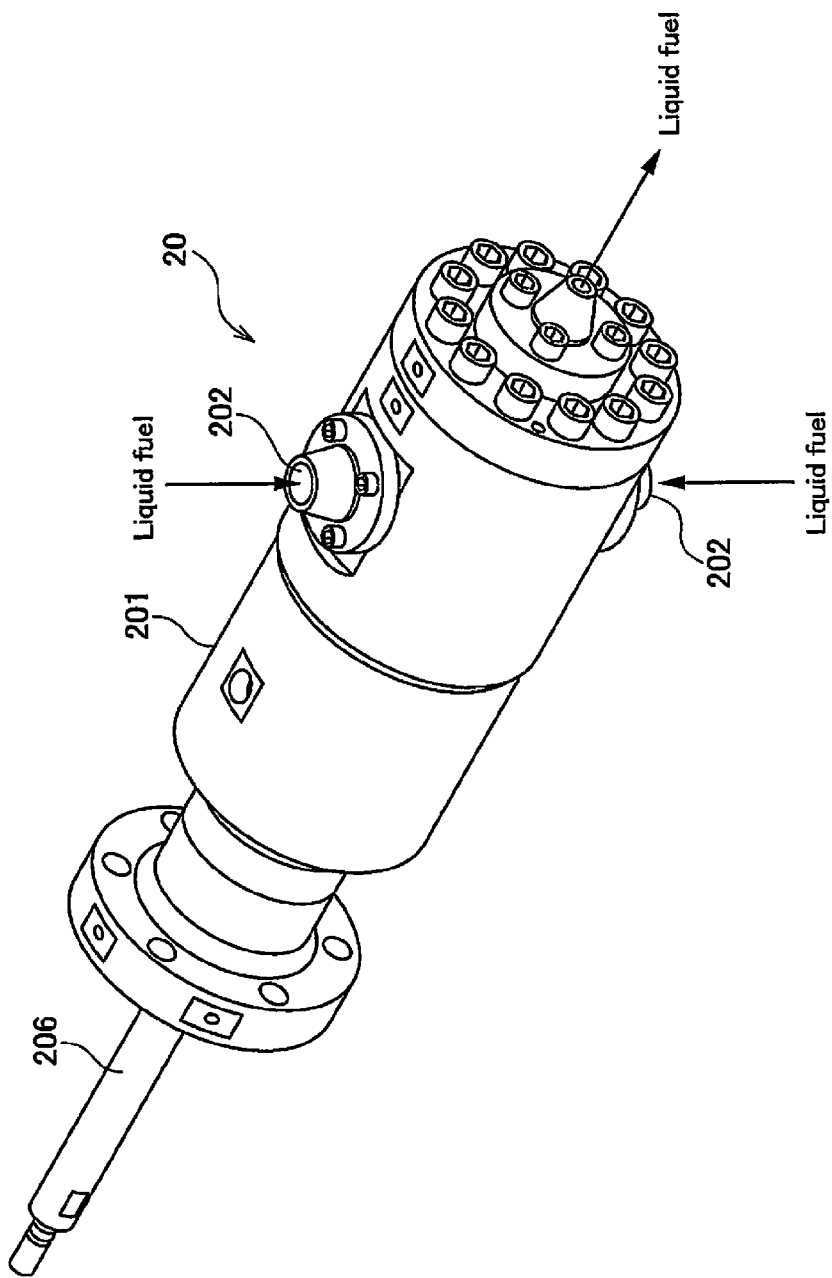
FIG. 2 illustrates a perspective view of an external appearance of the reciprocating pump that uses the intake/discharge valve body of the present embodiment.

FIG. 2 is a perspective view of an external appearance of the reciprocating pump 20. The reciprocating pump 20 is connected to the low temperature liquid fuel supply pipe 19 (see, FIG. 1) via the liquid fuel supply opening 202 that is disposed at an outer periphery of the cylinder 201, and the liquid fuel is sucked into the cylinder liner space of the reciprocating pump 20. Then, the piston 206 is pushed such that the sucked liquid fuel becomes highly pressurized. The liquid fuel is discharged from a first end of the reciprocating pump 20 via a below-mentioned discharge valve.

Figure 3:
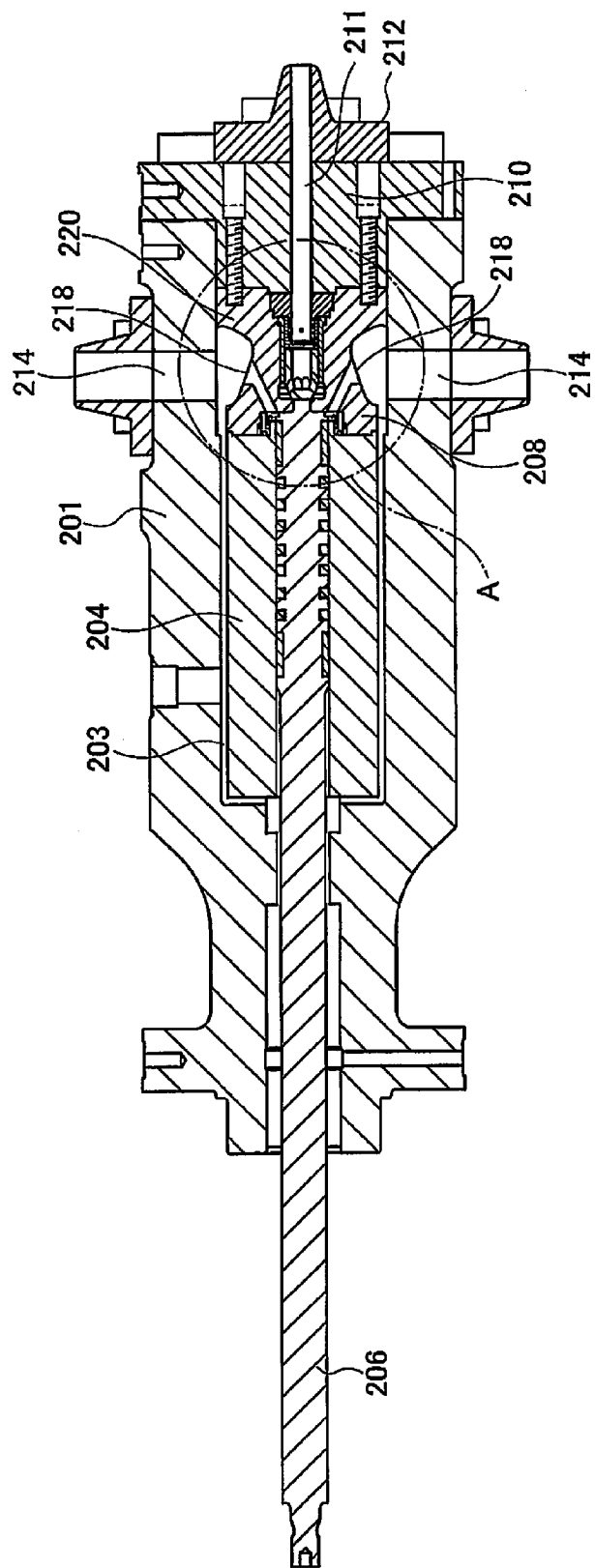
FIG. 3 illustrates a cross-sectional view of the reciprocating pump indicated in FIG. 2.

FIG. 3 is a cross-sectional view of the reciprocating pump 20.

The reciprocating pump 20 includes: a cylinder 201; a cylinder liner 204; a piston 206; an intake/discharge valve body 208; a top cover 210; and a flange 212, as main members.

The piston 206 and the cylinder liner 204 form a main body. The main body includes a cylinder liner interior space that is defined by the piston 206 and the cylinder liner 204.

The piston 206 is connected to a mechanism (not illustrated) that converts a rotating motion of the hydraulic motor 16 into a reciprocating motion, e.g., is connected to a cam shaft mechanism.

The cylinder 201 is cylinder-shaped and includes a recessed portion 203. The cylinder 201 is configured such that the cylinder liner 204 and the intake/discharge valve body 208 are abutted against each other. The cylinder 201 is configured such that the cylinder liner 204 is inserted into the recessed portion 203, the intake/discharge valve body 208 is then inserted into the recessed portion 203, and a top cover 210 is next inserted into the recessed portion 203. A supply through-hole 214 for supplying liquid fuel is disposed on a wall of the recessed portion 203, i.e., in a cylinder-shaped side wall of the cylinder 201. The cylinder liner 204 and the intake/discharge valve body 208 are abutted such that the cylinder interior space and both of a below-mentioned fluid supply portion and a below-mentioned fluid exhaust portion face each other.

The top cover 210 presses the valve body 208 towards the inside of the recessed portion 203. The top cover 210 fixes the opening of the recessed portion of the cylinder 201. The top cover 210 includes an exhaust through-hole 216 for exhausting the liquid fuel that has been discharged. Specifically, the intake/discharge valve body 208 includes a screw hole for engaging with a bolt on a side that connects to the top cover 210. The through-hole is disposed on the top cover 210. The top cover 210 presses the intake/discharge valve body 208 towards the inside of the recessed portion 203. The top cover 210 is fixed by having the bolt pass through the through-hole and engaging the bolt with the screw hole disposed on the intake/discharge valve body 208. The top cover 210 is simultaneously fixed to an opening of the recessed portion 203 of the top cover 210, by having a bolt (not illustrated) engaged with a through-hole disposed at an opening of the recessed portion 203 of the cylinder 201 from an end of the top cover 210 via a through-hole of the top cover 210.

Thus, the intake/discharge valve body 208 is an integrated structure and the integrated structure is inserted as a single unit into the cylinder 201. Therefore, the intake/discharge valve body 208 may be integrally exchanged as a single unit, in a case where repairing the reciprocating pump 20.

Intake/Discharge Valve Body

The intake/discharge valve body 208 (see, FIG. 3) has a rotary body shape including a portion having a narrow diameter in an intermediate portion thereof. In the above portion, a plurality of liquid fuel supply openings 218 are disposed on an outer periphery in order to guide the liquid fuel that is supplied via the supply through-hole 214 disposed in the cylinder 201 to the cylinder interior space inside the cylinder liner 204.

Figure 4:
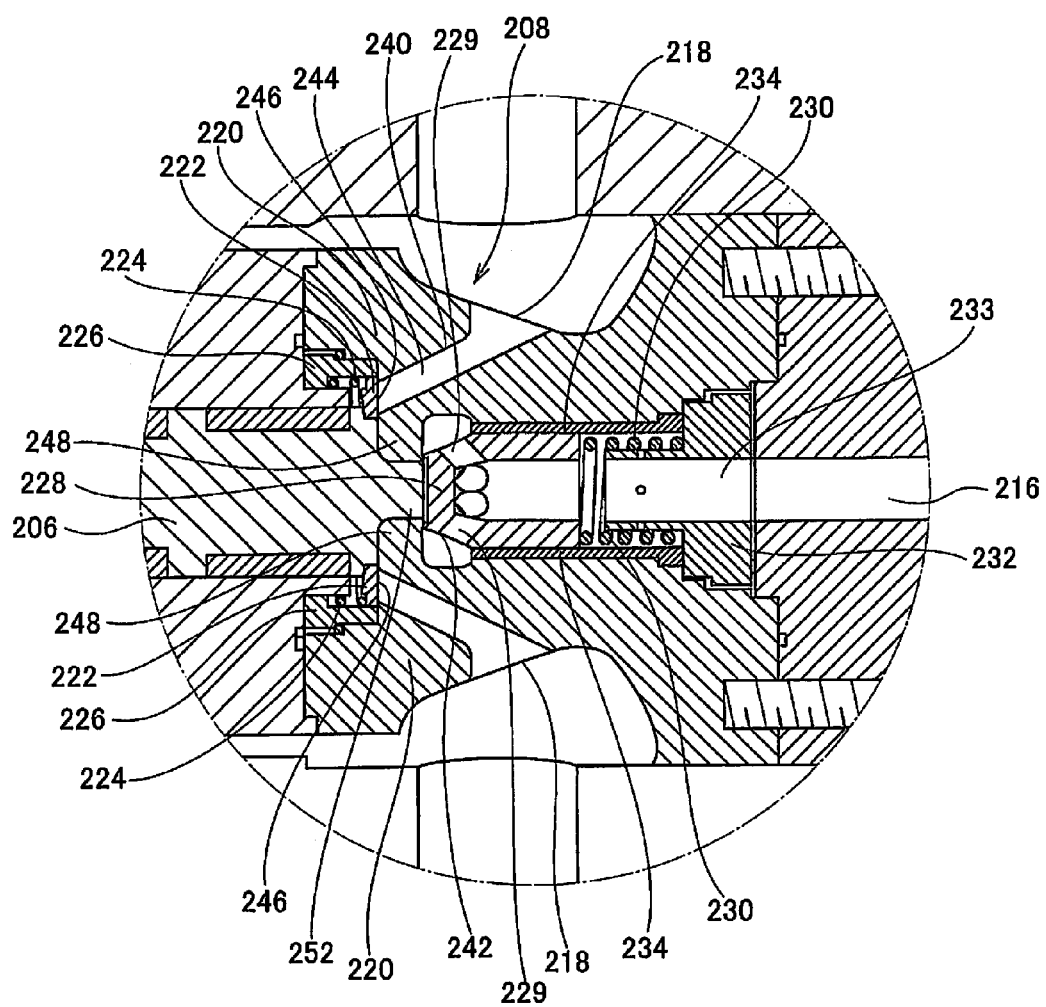
FIG. 4 illustrates a cross-sectional view of the intake/discharge valve body of the present embodiment inserted into a cylinder.
Figure 5:
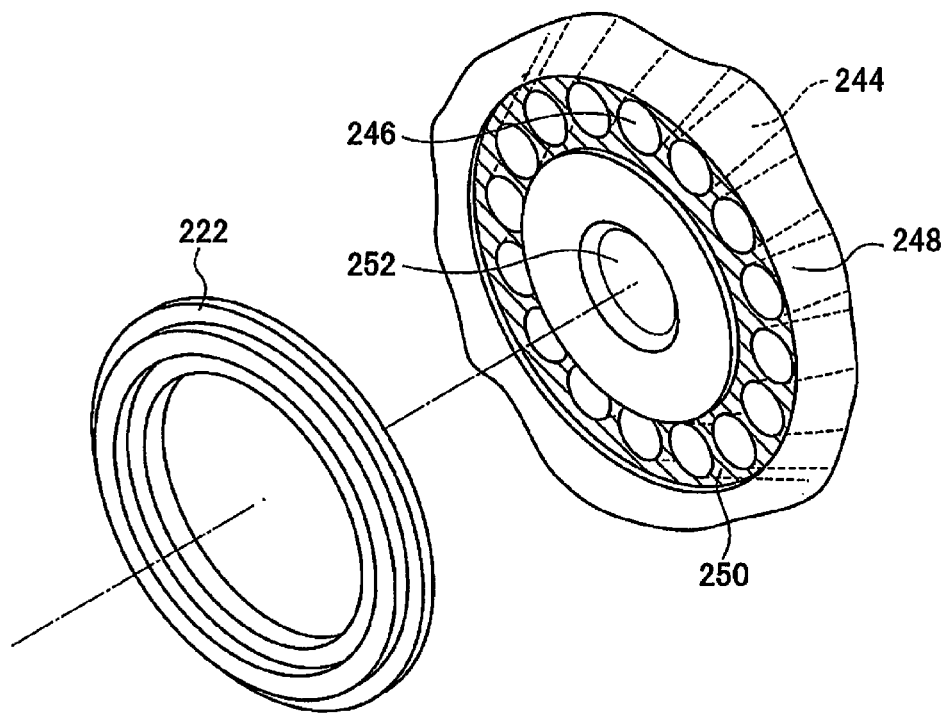
FIG. 5 illustrates a view of an intake valve and an intake hole of the intake/discharge valve body of the present embodiment.
Figure 6:
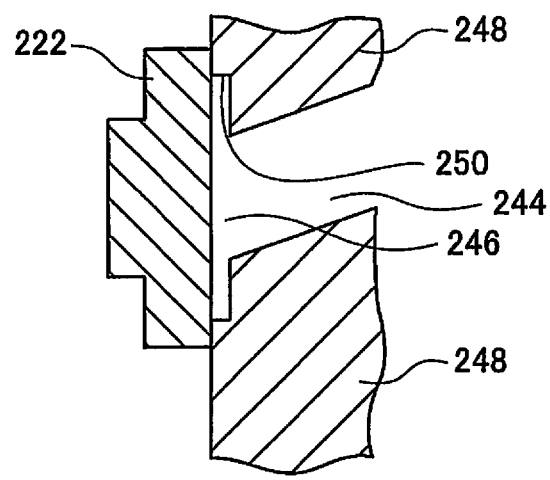
FIG. 6 illustrates a view of the intake valve and the intake hole of the intake/discharge valve body of the present embodiment.
Figure 7:
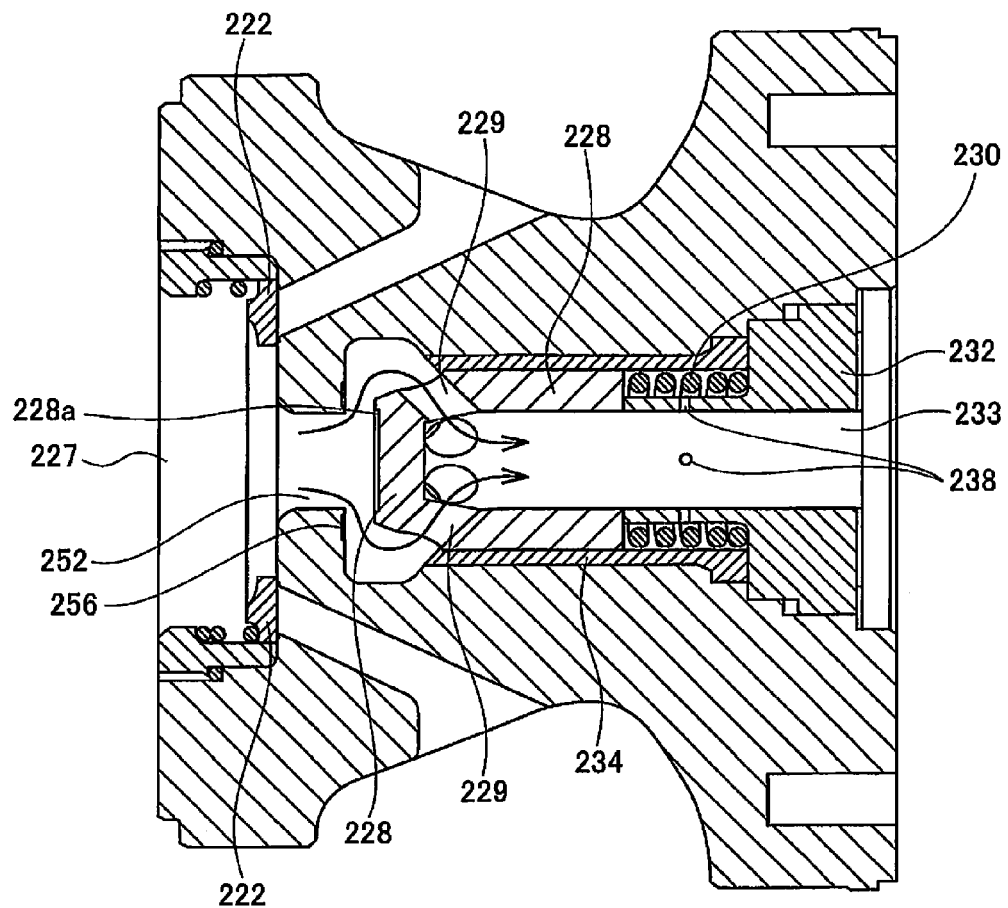
FIG. 7 illustrates an opened discharge hole and an opened discharge valve of the intake/discharge valve body of the present embodiment.

FIG. 4 is a cross-sectional view of the intake/discharge valve body 208 inserted into the cylinder 201. FIG. 4 is an enlarged view of a region A illustrated in FIG. 3. FIGS. 5 and 6 illustrate the intake hole and the intake valve of the intake/discharge valve body 208. FIG. 7 illustrates an opened discharge hole by a discharge valve of the intake/discharge valve body 208 being opened.

As illustrated in FIG. 4, the intake/discharge valve body 208 mainly includes: a valve seat body 220; an intake valve 222; an intake spring 224; an intake spring support member 226; a discharge valve 228; a discharge spring 230; a discharge spring support member 232; and a discharge liner 234.

The valve seat body 220 includes a fluid supply portion 240 (see, FIG. 4) that supplies fluid; and a fluid exhaust portion 242 (see, FIG. 4) that exhausts fluid.

The fluid supply portion 240 includes an supply pathway 244 provided in the valve seat body 220 that extends from the liquid fuel supply opening 218; a dividing wall 248 on which a plurality of intake openings 246 are formed to face the intake valve 222, the dividing wall 248 disposed at an end of the supply pathway 244; and a counterbore 250 (see, FIG. 5) that is disposed on the dividing wall 248 so as to surround a periphery of the plurality of intake openings 246. The intake opening 246 is an opening of the supply pathway 244. The counterbore 250 is a recessed portion. The counterbore 250 is configured such that the intake valve 222 abuts an edge of the recessed portion of the dividing wall 248, in a case where the intake valve 222 is biased against the dividing wall 248 of the fluid supply portion 240. The counterbore 250 (see, FIG. 5) is a step-shaped recessed portion that includes a recessed bottom recessed with a step for a surface of the dividing wall 248, at a periphery of the intake opening 246. The counterbore 250 is disposed such that the recessed portion abuts the intake valve 222. The edge of the recessed portion is a circumference of the recessed portion. In the example illustrated in FIG. 5, a plurality of intake openings 246 are concentrically arranged, and a discharge hole 252 is disposed in a middle of the concentric arrangement of the intake openings 246.

The fluid exhaust portion 242 includes: the dividing wall 248; and a discharge hole 252 disposed in the dividing wall 248.

One counterbore 250 is preferably disposed so as to surround all the intake openings 246 on the dividing wall 248 in order to increase an area that receives pressure from a side of the intake opening 246, as mentioned below.

The intake valve 222 is a disc-shaped plate member whose dimension is predetermined so as to block the intake opening 246, an opening being disposed in the middle of the member. The intake valve 222 is in contact with the intake spring 224. As illustrated in FIG. 4, the intake spring 224 is supported on the intake spring support member 226. The intake spring support member 226 is fixed to the valve seat body 220. Accordingly, the intake spring 224 pushes the intake valve 222 towards the fluid supply portion 240, and the intake valve 222 is biased against the fluid supply portion 240 via the intake spring 224. Specifically, pressure is applied against the dividing wall 248 of the fluid supply portion 240.

The intake spring support member 226 is preferably fixed to the valve seat body 220 in a point of view that the intake valve 222 is assembled and integrated to the valve seat body 220.

As previously mentioned, a step recessed portion is disposed as the counterbore 250, in the dividing wall 248 that has the plurality of intake openings 246, so as to surround the periphery of the plurality of intake openings 246, as illustrate in FIG. 5. The counterbore 250 is circumferentially arranged in a concentric shaped strip so as to surround the periphery of the intake openings 246, since the intake openings 246 are concentrically arranged in the example illustrated in FIG. 5.

As a result of the presence of the counterbore 250, the pressure difference at a start of the intake/discharge valve operation of the intake vale 222 may be reduced, the pressure difference being a pressure difference between the cylinder liner interior space 227 (see, FIG. 7) of the reciprocating pump 20 and the supply pathway 244 that is a space in which the fluid to be sucked exist. Thus, the liquid fuel intake may be conducted more efficiently.

Figure 8:
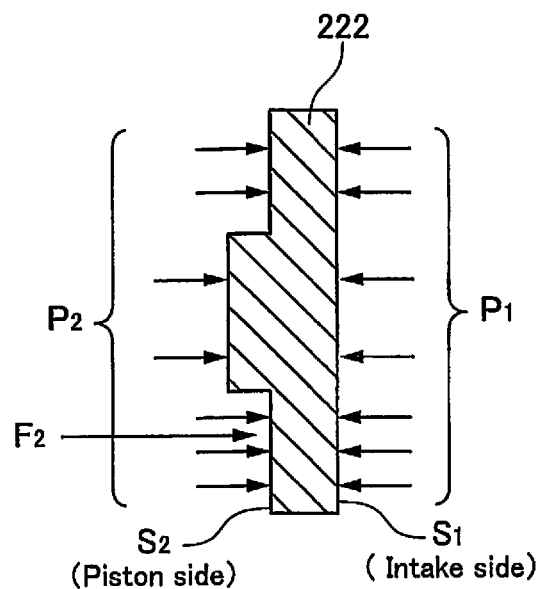
FIG. 8 describes pressure and force acting upon the intake valve.

FIG. 8 describes force and pressure effects on the intake valve 222. At a time when the intake valve 222 starts to open, a balanced state of force is given as $P1 \cdot S1 = P2 \cdot S2 + F2$, where P1 represents pressure on an intake side of the intake valve 222; S1 represents a surface area of the intake valve 222 that receives the pressure P1; P2 (also includes residual pressure of the cylinder liner interior space 227 (see, FIG. 7)) represents pressure of a piston side (cylinder liner interior space); S2 represents a surface area of the intake valve 222 that receives the pressure P2; and F2 represents force applied by the intake spring 224 against the intake valve 222. Subsequently, the operating pressure P2 in such a case is $(S1/S2) \cdot P1 - F2/S2$. Moreover, a pressure difference P1−P2 is $(S2-S1)/S2 \cdot P1 + F2/S2$.

Accordingly, the pressure difference may be reduced as a result of the surface area S1 of the intake valve 222 approaching the surface area S2. In other words, when the pressure of the cylinder liner interior space 227 is reduced by a backward movement of the piston 206, the intake valve 222 is opened by the abovementioned reduced pressure difference that results from the surface area S1 approaching the surface area S2, and the liquid fuel is sucked into the cylinder liner interior space 227. Subsequently, the liquid fuel intake efficiency of the reciprocating pump 20 may be improved. In addition, a reduction in the pressure difference is preferable to avoid vaporization of a portion of the liquid fuel due to a pressure reduction inside the piston interior space, since the liquid fuel is a cryogenic liquefied gas.

On the other hand, the discharge valve 228 has a cylindrical shape closed at one end. A plurality of discharge valve through-holes 229 are disposed in the discharge valve 228 to connect a cylinder-shaped exterior side and a space on the interior side, as illustrated in FIG. 4. The discharge valve 228 is disposed so as to cover a discharge hole 252 by abutting a wall at a peripheral edge of the discharge hole 252 for discharging the liquid fuel (in a case where the discharge hole 252 is closed). In a case where opening the discharge hole 252, the discharge valve 228 moves backward so as to be released from the discharge hole 252 to discharge the liquid fuel; the discharge through-hole 229 guides the discharged liquid fuel from the cylinder-shaped exterior side of the discharge valve 228 to the space on the interior side and then to the exhaust hole 233 disposed on the discharge spring support member 232. The discharge through-hole 229 functions in this way.

The discharge spring support member 232 is cylinder-shaped. A discharge spring 230 is disposed at an outer periphery of the cylinder-shaped discharge spring support member 232. A first end of the cylinder-shaped discharge spring support member 232 is formed into a flange shape. The discharge spring support member 232 forms an exhaust pathway along a central axis of the cylinder-shaped discharge spring support member 232 (see, FIG. 7). The discharge spring 230 is supported on the discharge spring support member 232 by the flange-shaped portion that supports the discharge spring 230. A first end of the discharge spring 230 is in contact with the discharge valve 228. The discharge spring support member 232 is fixed by a bolt or the like (not illustrated) to the valve seat body 220. Accordingly, the discharge spring 230 pushes the discharge valve 228 towards the fluid exhaust portion 242, and the discharge valve 228 is biased against the fluid exhaust portion 242. Specifically, pressure is applied against the dividing wall 248 (the wall of the peripheral edge of the discharge hole 252) of the fluid exhaust portion 242.

The discharge liner 234 is disposed along a wall surface of the recessed portion of the valve seat body 220. The discharge valve 228 is configured to move along an inner wall of the discharge liner 234.

The discharge valve 228 is a cylinder-shaped and closed at the first end, so as to block the discharge hole 252 that connects the liquid fuel filled cylinder liner interior space 227 (see, FIG. 7) defined by the piston 206 and the cylinder liner 204. The closed first end blocks the discharge hole 252 by the application of pressure on the discharge valve 228. Force received by the discharge valve 228 from the pressure inside the cylinder liner interior space 227 causes the discharge valve 228 to open the discharge hole 252 in a case where a bias of the discharge spring 230 is overcome. In a case where opening the discharge hole 252, as illustrated in FIG. 7, the discharged liquid fuel is guided to a space in the interior from the cylindrical exterior via the through-hole 229, and then flows to the exhaust hole 233, which is the exhaust pathway of the discharge spring support member 232.

It is preferable that the support member through-hole 238 is disposed in the wall of the cylindrically-shaped side of the discharge spring support member 232, the support member through hole 238 connecting a space of the exterior and the exhaust hole 233 that is a part of the discharge pathway of the cylindrical interior, as illustrated in FIG. 7. The support member through-hole 238 guides a portion of the discharged liquid fuel existing in the cylindrical exterior of the discharge spring support member 232 to the inside of the exhaust hole 233 via the support member through-hole 238 in a case where the discharge hole 252 is opened by the discharge valve 228. At this time, a side end of the discharge valve 228 opposite to the dividing wall 248 abuts an end of the discharge spring support member 232. However, at the time of abutment, a damper effect is exerted against sudden movement of the discharge valve 228, as a result of the flow of the liquid fuel. Therefore, the sudden movement of the discharge valve 228 may be prevented, and an impact at the time of abutment by the discharge valve 228 and the discharge spring support member 232 may be reduced. As illustrated in FIG. 7, while the support member through-hole 238 is disposed at four locations on a periphery of a wall surface of the exhaust hole 233, or the like, the number of support member through-holes 238 is not specifically limited in any manner.

As illustrated in FIG. 4, the above discharge valve 228 is disposed so as to block the discharge hole 252 by abutting with the wall of the peripheral edge of the discharge hole 252 for discharging the liquid fuel. In addition, the discharge valve 228, which is a portion receiving liquid fuel pressure from a side of the discharge hole 252, includes the pressure-receiving recessed portion 228a that is recessed with a step for a portion of the discharge valve 228 that abuts the peripheral edge wall of the discharge hole 252, as illustrated in FIG. 7. The pressure-receiving recessed portion 228a is disposed in a region that is wider than the exterior periphery of the discharge hole 252. In other words, a surface area of the pressure-receiving recessed portion 228a that receives a liquid fuel pressure from a side of the discharge hole 252 is wider than a hole area of the discharge hole 252. Accordingly, the liquid fuel discharge efficiency may be improved in the reciprocating pump 20.

Figure 9:
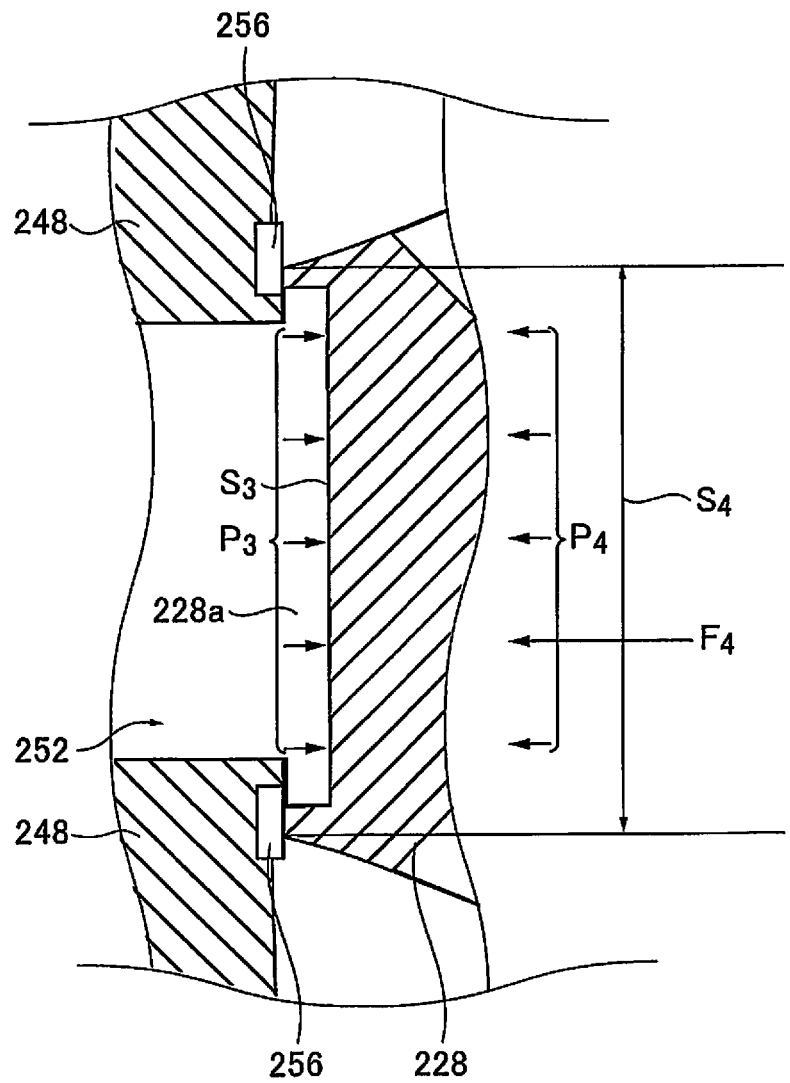
FIG. 9 describes pressure and force acting upon the discharge valve.

FIG. 9 describes force and pressure acting on the discharge valve 228. At a time when the discharge valve 228 starts to open, a balanced state of force is given as $P_3 \cdot S_3 = P_4 \cdot S_4 + F_4$, where: $P_3$ represents liquid fuel pressure on a side of the discharge hole 252; $S_3$ represents a surface area of the discharge valve 228 that receives the pressure $P_3$; $P_4$ represents pressure on a side of the discharge valve 228; $S_4$ represents a pressure-receiving surface area of the discharge valve 228 that receives the pressure $P_4$; and $F_4$ represents force applied by the discharge spring 230 on the discharge valve 228. Subsequently, the operating pressure $P_3$ in such a case is $(S_4/S_3) \cdot P_4 + F_4/S_3$. Moreover, a pressure difference $P_3-P_4$ at the start of an operation of the discharge valve 228 is $(S_4-S_3)/S_3 \cdot P_4 + F_4/S_3$.

Accordingly, the pressure difference may be reduced as a result of the surface area $S_3$ of the discharge valve 228 approaching the surface area $S_4$. In other words, when the pressure of the cylinder liner interior space 227 is increased by a forward movement of the piston 206, the discharge valve 228 is opened by the abovementioned reduced pressure difference that results from the surface area $S_3$ approaching the surface area $S_4$, and then the liquid fuel flows to the side of the discharge valve 228. Subsequently, the liquid fuel discharge efficiency of the reciprocating pump 20 may be improved.

The discharge valve 228 abuts the wall of the peripheral edge of the above discharge hole 252 in a case where the discharge hole 252 is blocked. The wall of the peripheral edge that abuts the discharge valve 228 of the discharge hole 252 is composed of a high hardness member 256 having a high Vickers harness in comparison to a portion of the valve seat body 220 positioned on an exterior of the peripheral edge wall, as illustrated in FIGS. 7 and 9. The life-span of the valve seat body 220 is lengthened by the high hardness member 256. The high hardness member 256 may be employed as a stellite member obtained by melting, e.g., laser irradiation of a stellite powder (laser cladding).

As described above, in the intake/discharge valve body 208 of the reciprocating pump 20 of the present embodiment, the counterbore 250 is disposed so as to surround a periphery of the plurality of intake openings 246 that are disposed on the dividing wall 248, and the intake valve 222 is configured to abut an edge of the counterbore 250, not the opening edges of the intake openings 246. Thus, the pressure difference at a start of operation of the intake valve 222 between the discharge space and the cylinder liner interior space 227 that activates operation of the intake valve 222 may be reduced. As a result, the liquid fuel efficiency may be greatly improved.

Moreover, the discharge valve 228 is disposed such that the discharge hole 252 is blocked by abutment with the wall of the peripheral edge (peripheral edge is a portion of the discharge valve 228 that blocks the discharge hole 252) of the discharge hole 252 disposed in the fluid exhaust portion 242 for discharging, and the discharge valve 228 that receives the liquid fuel pressure from a side of the discharge hole 252 includes the pressure-receiving recessed portion 228a that is recessed with a step for a portion of the discharge valve 228 that abuts the wall of the peripheral edge of the discharge hole 252. The pressure-receiving recessed portion 228a is disposed in a region that is wider than the exterior periphery of the discharge hole 252. Accordingly, the pressure difference may be reduced at a start of an operation of the discharge valve 228. As a result, the liquid fuel discharge efficiency may be may be highly improved.

In addition, the intake/discharge valve body 208 is an integrated structure integrally including the intake valve 222 and the discharge valve 228, which is inserted as a single unit into the cylinder 201. Therefore, the intake/discharge valve body 208 may be integrally exchanged as a single unit in a case where repairing the reciprocating pump 20. Accordingly, repairs of the reciprocating pump 20 may be rapidly performed.

As illustrated in FIG. 7, the support member through-hole 238 that connects an space on the exterior of the cylinder-shaped discharge spring support member 232 to the exhaust hole 233 that is a part of the discharge pathway of the cylindrical interior is disposed on the wall of the discharge spring support member 232, and a portion of the liquid fuel in the cylindrical exterior of the discharge spring support member 232 can be guided to the inside of the discharge pathway via the support member through-hole 238 by way of the support member through-hole 238. A damper effect is exerted against sudden movement of the discharge valve 228 as a result of the liquid fuel flow. Therefore, an impact at a time of abutment between the discharge valve 228 and the discharge spring support member 232 may be reduced.

In the intake/discharge valve body 208 of the present embodiment, the mechanism of the discharge valve 228 and the intake valve 222 are integrated into the valve seat body 220, and thus a valve may operate with a high degree of precision, and a highly precise valve configuration may be achieved. Moreover, the mechanism of the intake valve 222 and the discharge valve 228 are integrated in the valve seat body 220, and thus a problem with some part of the mechanism of the intake valve 222 and the discharge valve 228 may be easily identified by taking out the intake/discharge valve body 208 from the cylinder 201 in a case where there is a malfunction in an intake operation or a discharge operation of the reciprocating pump 20. With respect to a conventional reciprocating pump, an intake valve, a discharge valve, and a valve seat body are arranged to peripheral parts of a valve seat body, and a position or the like of the arranged intake valve, the arranged discharge valve, and the valve seat body is first determined during assembly of the reciprocating pump. Thus, it was difficult to identify which part presented a problem by just taking out the valve seat body from the cylinder 201. As a result, the intake/discharge valve body 208 that is integrated by the mechanism of the intake valve 222 and the discharge valve 228 in the valve seat body 220 of the present embodiment is superior.

The cryogenic liquefied gas intake/discharge valve body, the reciprocating pump, and the fuel gas supply device of the present description have been described in detail above. However, present description is not limited to the above embodiments. Accordingly, various improvements or modifications may be made, so long as the scope does not deviate from the gist of that which is described in the detailed description.

The invention claimed is:

1. A fluid intake/discharge valve body that is used for suction of a cryogenic liquefied gas fluid into a cylinder liner and a discharge of a cryogenic liquefied gas fluid with a piston, comprising:
    a valve seat body, including:
        a fluid supply portion configured to supply the fluid, and
        a fluid exhaust portion configured to exhaust the fluid;
    an intake valve configured to be biased by an intake spring against the fluid supply portion of the valve seat body; and
    a discharge valve configured to be biased by a discharge spring against the fluid exhaust portion of the valve seat body,
    the fluid supply portion, including:
        a supply pathway configured to connect to a supply pipe,
        a dividing wall including a plurality of intake holes configured to face the intake valve disposed at an end of the supply pathway, and
        a counterbore that is a recessed portion disposed on the dividing wall, the counterbore surrounding the plurality of intake holes, and the counterbore configured such that the intake valve abuts an edge of the recessed portion in a case where the intake valve is biased against the fluid supply portion.

2. The fluid intake/discharge valve body according to claim 1, wherein all of the intake holes are surrounded by the one counterbore disposed on the dividing wall.

3. The fluid intake/discharge valve body according to claim 2, wherein an intake spring support member configured to support the intake spring are disposed on the valve seat body, and the intake spring support member is fixed to the valve seat body.

4. The fluid intake/discharge valve body according to claim 2, wherein a discharge spring support member configured to support the discharge spring are disposed on the valve seat body, and the discharge spring support member is fixed to the valve seat body.

5. The fluid intake/discharge valve body according to claim 2, wherein
    the discharge valve is configured to block a discharge hole by abutting a wall of the peripheral edge of a discharge hole, the discharge hole being disposed in the fluid exhaust portion to discharge the fluid, and
    the discharge valve has a portion configured to receive pressure of the fluid from a side of the discharge hole, the portion of the discharge valve including a pressure-receiving recessed portion recessed with a step for the portion of the discharge valve that is configured to abut the wall of the peripheral edge of the discharge hole, the pressure-receiving recessed portion being disposed in a region that is wider than an outer periphery of the discharge hole.

6. The fluid intake/discharge valve body according to claim 2, wherein
    the discharge valve has a cylindrical shape closed at one end, the discharge valve is configured to block the discharge hole that is connected to a liquid fuel filled cylinder liner interior space defined by the piston and the cylinder liner, the discharge valve includes a discharge valve through-hole connecting an exterior space and an interior space of the cylindrical shape, the discharge valve is configured to guide the discharged fluid from the exterior space to the interior space in a case where the discharge hole is open, and the discharge valve is configured to direct the discharged fluid to an exhaust hole disposed on a cylindrical discharge spring support member that supports the discharge spring, and
    the cylindrical discharge spring support member has a support member through hole disposed in a cylindrical side wall thereof, the support member through hole connecting an outside of the cylindrical discharge spring support member and the exhaust hole that is in the cylindrical discharge spring support member, and the support member through hole being configured to guide a portion of the discharged fluid existing in the outside of the cylindrical discharge spring support member into the exhaust hole in a case where the discharge hole is opened by the discharge valve.

7. The fluid intake/discharge valve body according to claim 1, wherein an intake spring support member configured to support the intake spring are disposed on the valve seat body, and the intake spring support member is fixed to the valve seat body.

8. The fluid intake/discharge valve body according to claim 1, wherein a discharge spring support member configured to support the discharge spring are disposed on the valve seat body, and the discharge spring support member is fixed to the valve seat body.

9. The fluid intake/discharge valve body according to claim 1, wherein
    the discharge valve is configured to block a discharge hole by abutting a wall of the peripheral edge of a discharge hole, the discharge hole being disposed in the fluid exhaust portion to discharge the fluid, and the discharge valve has a portion configured to receive pressure of the fluid from a side of the discharge hole, the portion of the discharge valve including a pressure-receiving recessed portion recessed with a step for the portion of the discharge valve that is configured to abut the wall of the peripheral edge of the discharge hole, the pressure-receiving recessed portion being disposed in a region that is wider than an outer periphery of the discharge hole.

10. The fluid intake/discharge valve body according to claim 1, wherein the discharge valve has a cylindrical shape closed at one end, the discharge valve is configured to block the discharge hole that is connected to a liquid fuel filled cylinder liner interior space defined by the piston and the cylinder liner, the discharge valve includes a discharge valve through-hole connecting an exterior space and an interior space of the cylindrical shape, the discharge valve is configured to guide the discharged fluid from the exterior space to the interior space in a case where the discharge hole is open, and the discharge valve is configured to direct the discharged fluid to an exhaust hole disposed on a cylindrical discharge spring support member that supports the discharge spring, and the cylindrical discharge spring support member has a support member through hole disposed in a cylindrical side wall thereof, the support member through hole connecting an outside of the cylindrical discharge spring support member and the exhaust hole that is in the cylindrical discharge spring support member, and the support member through hole being configured to guide a portion of the discharged fluid existing in the outside of the cylindrical discharge spring support member into the exhaust hole in a case where the discharge hole is opened by the discharge valve.

11. The fluid intake/discharge valve body according to claim 10, wherein the discharge valve is configured to abut the wall of the peripheral edge of the discharge hole in a case where the discharge hole is blocked, and the wall of the peripheral edge of the discharge hole includes a high hardness member having a Vickers harness higher than a portion positioned on an exterior of the wall of the peripheral edge of the valve seat body.

12. A fluid intake/discharge valve body that is used for a suction of a cryogenic liquefied gas fluid into a cylinder liner and a discharge of a cryogenic liquefied gas fluid with a piston, comprising:

a valve seat body, including:
a fluid supply portion configured to supply the fluid, and
a fluid exhaust portion configured to exhaust the fluid;
an intake valve configured to be biased by an intake spring against the fluid supply portion of the valve seat body; and
a discharge valve configured to be biased by a discharge spring against the fluid exhaust portion of the valve seat body,
the discharge valve is configured to block a discharge hole disposed in the fluid exhaust portion by abutting a wall of the peripheral edge of the discharge hole, the discharge hole being disposed in the fluid exhaust portion to discharge the fluid, and the discharge valve having a portion configured to receive pressure of the fluid from a side of the discharge hole, the portion including a pressure-receiving recessed portion recessed with a step for a portion of the discharge valve that is configured to abut the wall of the peripheral edge of the discharge hole, the pressure-receiving recessed portion being disposed in a region that is wider than an outer periphery of the discharge hole.

13. A reciprocating pump, comprising:

a main body including:
a piston configured to discharge a cryogenic liquefied gas fluid,
a cylinder liner configured to suck in the cryogenic liquefied gas fluid, and
a cylinder liner interior space defined by the piston and the cylinder liner;

an intake/discharge valve body configured to abut the main body, the intake/discharge valve body including:
a valve seat body, including:
a fluid supply portion configured to supply the fluid, and
a fluid exhaust portion configured to exhaust the fluid,
an intake valve configured to be biased by an intake spring against the fluid supply portion of the valve seat body, and
a discharge valve configured to be biased by a discharge spring against the fluid exhaust portion of the valve seat body, the fluid supply portion including:
a supply pathway configured to connect a supply pipe,
a dividing wall including a plurality of intake holes configured to face the intake valve that is disposed at an end of the supply pathway, and
a counterbore that is a recessed portion disposed on the dividing wall, the counterbore surrounding the plurality of intake holes, and the counterbore configured such that the intake valve abuts an edge of the recessed portion in a case where the intake valve is biased against the fluid supply portion;

a cylinder including:
a recessed portion into which the cylinder liner and then the intake/discharge valve body are configured to be inserted, the cylinder liner and the intake/discharge valve being in contact with each other such that the cylinder liner interior space and both of the dividing wall of the fluid supply portion and the fluid exhaust portion face each other, and
a supply through-hole disposed on a wall of the recessed portion and configured to supply the fluid; and a cylinder cover disposed at an opening of the recessed portion of the cylinder and including an exhaust through-hole configured to exhaust the discharged fluid, the cylinder cover configured to fix the intake/discharge valve body in the recessed portion by pressing the intake/discharge valve body towards an inside of the recessed portion.

14. The reciprocating pump according to claim 13, wherein the discharge valve is configured to block the discharge hole by abutting the wall of the peripheral edge of a discharge hole for discharging the fluid, the discharge hole disposed in the fluid exhaust portion, and the discharge valve has a portion configured to receive pressure of the fluid from a side of the discharge hole and including a pressure-receiving recessed portion that is recessed with a step for the discharge valve that is configured to abut the wall of the peripheral edge of the discharge hole, the pressure-receiving recessed portion being disposed in a region that is wider than an outer periphery of the discharge hole.

15. The reciprocating pump according to claim 14, wherein the intake/discharge valve body is an integrated structure that is integrally exchangeable.

16. The reciprocating pump according to claim 13, wherein the intake/discharge valve body is an integrated structure that is integrally exchangeable.

17. A reciprocating pump, comprising:
a main body including:
    a piston configured to discharge a cryogenic liquefied gas fluid,
    a cylinder liner configured to suck in the cryogenic liquefied gas fluid, and
    a cylinder liner interior space defined by the piston and the cylinder liner;
an intake/discharge valve body configured to abut the main body, the intake/discharge valve body including:
    a valve seat body, including:
        a fluid supply portion configured to supply the fluid, and
        a fluid exhaust portion configured to exhaust the fluid;
    an intake valve configured to be biased by an intake spring against the fluid supply portion of the valve seat body; and
    a discharge valve configured to be biased by a discharge spring against the fluid exhaust portion of the valve seat body, the discharge valve configured to block the discharge hole by abutting a wall of the peripheral edge of a discharge hole that is disposed in the fluid exhaust portion to discharge the fluid, and the discharge valve having a portion configured to receive pressure of the fluid from a side of the discharge hole and including a pressure-receiving recessed portion that is recessed with a step for the discharge valve that is configured to abut the wall of the peripheral edge of the discharge hole, the pressure-receiving recessed portion being disposed in a region that is wider than an outer periphery of the discharge hole;
a cylinder including:
    a recessed portion into which the cylinder liner and then the intake/discharge valve body are configured to be inserted, the cylinder liner and the intake/discharge valve body being in contact with each other such that the cylinder liner interior space and both of the dividing wall of the fluid supply portion and the fluid exhaust portion face each other, and
    a supply through-hole disposed on a wall of the recessed portion and configured to supply the fluid; and
a cylinder cover disposed at an opening of the recessed portion of the cylinder and including an exhaust through-hole configured to exhaust the discharged fluid, the cylinder cover configured to fix the intake/discharge valve body in the recessed portion by pressing the intake/discharge valve body towards an inside of the recessed portion.

18. The reciprocating pump according to claim 17, wherein the intake/discharge valve body is an integrated structure that is integrally exchangeable.

19. A fuel gas supply device, comprising:
a tank configured to store liquid fuel that is a cryogenic liquefied gas fluid;
a reciprocating pump configured to suck the liquid fuel from the tank and exhaust the liquid fuel under a constant pressure;
a vaporization device configured to vaporize the liquid fuel that is exhausted into a gas; and
a gas supply pipe configured to supply the gas to a gas combustion engine,
the reciprocating pump being configured to suck the cryogenic liquefied gas fluid into a cylinder liner and discharge the cryogenic liquefied gas fluid with a piston, the reciprocating pump comprising:
a main body including:
    the piston configured to discharge the cryogenic liquefied gas fluid,
    the cylinder liner configured to suck in the cryogenic liquefied gas fluid, and
    a cylinder liner interior space defined by the piston and the cylinder liner;
an intake/discharge valve body configured to abut the main body, the intake/discharge valve body including:
    a valve seat body, including:
        a fluid supply portion configured to supply the fluid, and
        a fluid exhaust portion configured to exhaust the fluid,
    an intake valve configured to be biased by an intake spring against the fluid supply portion of the valve seat body, and
    a discharge valve configured to be biased by a discharge spring against the fluid exhaust portion of the valve seat body,
    the fluid supply portion, including:
        a supply pathway configured to connect to a supply pipe,
        a dividing wall including a plurality of intake holes configured to face the intake valve disposed at an end of the supply pathway, and
        a counterbore that is a recessed portion disposed on the dividing wall, the counterbore surrounding the plurality of intake holes, and the counterbore configured such that the intake valve abuts an edge of the recessed portion in a case where the intake valve is biased against the fluid supply portion;
a cylinder including:
    a recessed portion into which the cylinder liner and then the intake/discharge valve body are configured to be inserted, the cylinder liner and the intake/discharge valve body being in contact with each other such that the cylinder liner interior space and both of the dividing wall of the fluid supply portion and the fluid exhaust portion face each other, and
    a supply through-hole disposed on a wall of the recessed portion and configured to supply the fluid; and
a cylinder cover disposed at an opening of the recessed portion of the cylinder, the cylinder cover including an exhaust through-hole configured to exhaust the discharged fluid, the cylinder cover configured to fix the intake/discharge valve body in the recessed portion by pressing the intake/discharge valve body towards an inside of the recessed portion.

20. A fuel gas supply device, comprising:
a tank configured to store liquid fuel that is a cryogenic liquefied gas fluid;
a reciprocating pump configured to suck the liquid fuel from the tank and exhaust the liquid fuel under a constant pressure;
a vaporization device configured to vaporize the liquid fuel that is exhausted into a gas;
a gas supply pipe configured to supply the gas to a gas combustion engine, the reciprocating pump configured to suck the cryogenic liquefied gas fluid into a cylinder liner and discharge the cryogenic liquefied gas fluid with a piston, the reciprocating pump comprising:
a main body including:
a piston configured to discharge the cryogenic liquefied gas fluid,
a cylinder liner configured to suck in the cryogenic liquefied gas fluid, and
a cylinder liner interior space defined by the piston and the cylinder liner;
an intake/discharge valve body configured to abut the main body, the intake/discharge valve body including:
a valve seat body, including:
a fluid supply portion configured to supply the fluid, and
a fluid exhaust portion configured to exhaust the fluid,
an intake valve configured to be biased by an intake spring against the fluid supply portion of the valve seat body, and
a discharge valve configured to be biased by a discharge spring against the fluid exhaust portion of the valve seat body,
the discharge valve being further configured to block the discharge hole by abutting a wall of the peripheral edge of the discharge hole that is disposed in the fluid exhaust portion to discharge the fluid, and
the discharge valve having a portion configured to receive pressure of the fluid from a side of the discharge hole and including a pressure-receiving recessed portion that is recessed with a step for the portion of the discharge valve that is configured to abut the wall of the peripheral edge of the discharge hole, the pressure-receiving recessed portion being disposed in a region that is wider than outer periphery of the discharge hole;
a cylinder including:
a recessed portion into which the cylinder liner and then the intake/discharge valve body are configured to be inserted, the cylinder liner and the intake/discharge valve body being in contact with each other such that the cylinder liner interior space and both of the dividing wall of the fluid supply portion and the fluid exhaust portion face each other, and
a supply through-hole disposed on a wall of the recessed portion and configured to supply the fluid; and
a cylinder cover disposed at an opening of the recessed portion of the cylinder, the cylinder cover including an exhaust through-hole configured to exhaust the discharged fluid, the cylinder cover configured to fix the intake/discharge valve body in the recessed portion by pressing the intake/discharge valve body towards an inside of the recessed portion.

* * * * *